July 14, 1970          P. D. O'KRAY          3,520,038

PROCESS FOR COATING AN INTERLACED SHEET MATERIAL

Filed April 1, 1968          3 Sheets-Sheet 1

PAUL D. O'KRAY
INVENTOR

BY John R. Faulkner
Glenn S. Arendsen
ATTORNEYS

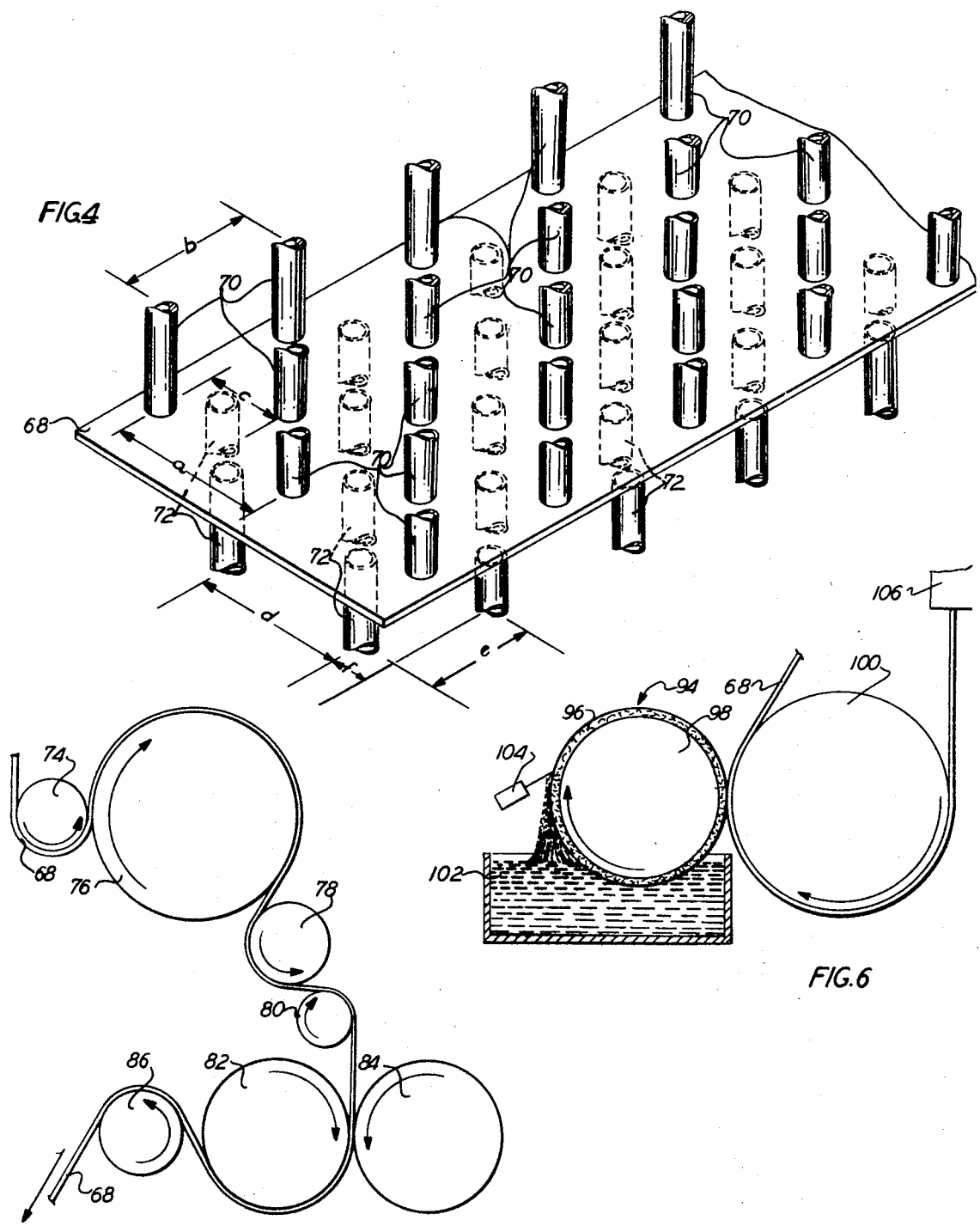

United States Patent Office 3,520,038
Patented July 14, 1970

3,520,038
PROCESS FOR COATING AN INTERLACED SHEET MATERIAL
Paul D. O'Kray, Dearborn, Mich., assignor to Ford Motor Company, Dearborn, Mich., a corporation of Delaware
Filed Apr. 1, 1968, Ser. No. 717,553
Int. Cl. D06c 27/00
U.S. Cl. 28—74                                10 Claims

ABSTRACT OF THE DISCLOSURE

A polyvinyl chloride resin having an inherent viscosity of about 1.31 is blended with a plasticizer, a filler, and any desired pigmentation, hot worked calendered into a sheet material, cut into narrow tapes, and kitted into a material particularly suited for use as an upholstery covering for automobile seats and home furnishings. A protective coating is applied to each exposed element of the knitted material without affecting its breathability by a felt covered applicator roll. The resuling material is strong, stable, luxurious, abrasion resistant, and breathable.

SUMMARY OF THE INVENTION

Most of the sheet materials previously used as upholstery coverings for automobile and household seats compirsed an imprevious film of a polymeric material strengthened with a fabric backing. The tensile strength, tear strength, abrasion resistance and flexibility at high and low temperatures of these materials have been improved considerably in recent years, but the imperviousness of the material has remained to plague seat designers. Because of the imperviousness, upholstered seats were extremely warm in warm weather and extremely cold in cold weather. Luxury automobiles have turned to fabric covered seats to avoid this difficulty and achieve a more aesthetic appearance. Strength requirements and cleaning difficulties, however, have rendered this solution something less than completely satisfactory.

Numerous attempts to knit thin strips or tapes cut from a polymeric film into a breathable material suitable for upholstering automobile seats have been unsuccessful primarily because the films suitable for the knitting operation produced knitted materials have undesirable forming properties, abrasion resistance, and flexibility at low temperatures. For example, it is necessary to fold the thin tapes prior to the actual knitting operation and all attempts to uniformly fold tapes from conventional sheet materials on a production basis were unsuccessful. In addition, the materials knitted therefrom has an unsatisfactory combination of properties.

This invention provides a polymeric film readily capable of being formed into strips and interlaced into a breathable knitted material having an excellent combination of tensile strength, abrasion resistance, breathability, flexibility and aesthetic appearance. As used herein, the term "interlaced" is intended to include both knitting and weaving operations. The primary component of these sheet materials is a polyvinyl chloride resin having an inherent viscosity of at least about 1.28. Ordinarily, this polyvinyl chloride resin is blended with suitable amounts of an appropriate plasticizer, fillers, and pigments, and the blend is hot worked to achieve thorough mixing of the ingredients and an appropriate relationship of the plasticizer to the resin. The blend is then calendered into a relatively thin film, and the film is sliced into a plurality of narrow tapes. Tapes reinforced by being folded around a polymeric fiber having a relatively high tensile strength are then interlaced into a sheet material.

A circular knitting machine is preferably used for the interlacing operation although a wide variety of knitting or weaving operations can be used. The cylinder of knitted material resulting from the circular knitting operation is sliced longitudinally and spread out into a relatively flat sheet. Next the flat sheet is passed through a tentering operation in which each portion of the sheet is thoroughly heated to a predetermined temperature. The tentering operation relieves stresses produced in the knitting operation to prevent curling and improve stiffness and also laterally stretches the material to reduce the weight per unit area. Thorough heating is accomplished during the tentering operation by directing streams of hot air against the sheet material; the porous nature of the material circulates the hot air around each knitted element and produces an essentially uniform temperature.

After the tentering operation the knitted material is coated with a mixture of polyvinyl chloride and polymethyl methacrylate. A felt roll is dipped in a solution of the coating material, which is applied to the knitted material as the knitted material passes between the felt roll and a rubber backup roll. Excess coating solution is removed from the felt roll by a doctor blade.

Inherent viscosities of the polyvinyl chloride resins used in the materials of this invention are determined according to the test procedure described in ASTM D-1243, method A. A solution of 0.2 gram of the resin in cyclohexanone is used in the determination, which is performed at 30° C. Tapes made from polyvinyl chloride resins having an inherent viscosity below 1.28 cannot be folded and knitted consistently and also lack the cold flexibility necessary in automobile seat coverings.

A critical step in manufacturing the sheet materials of this invention is the hot working operation. During hot working, molecules of the plasticizer surround the polymer chains of the resin and arrange the chains in a manner rendering the resulting blend more suitable for knitting. Hot working preferably is carried out in two stages with the first stage being a hot mixing operation of a relatively random nature and the second stage being a hot rolling operation. Polyvinyl chloride resins having inherent viscosities higher than about 1.35 do not readily achieve the desired arrangement of plasticizer and resin, and resins having inherent viscosities less than this value are therefore preferred. The best combination of manufacturing properties and product properties results from the use of polyvinyl chloride resins having inherent viscosities between about 1.30 and 1.33.

The tearing strength as determined by the Elmendorf method of specimens taken from the hot worked material provides a useful indication of the degree of hot working. In the Elmendorf method, which is fully described in ASTM D-689, a slit is cut in the specimen and the tearing strength along the slit is determined. Elmendorf tear strengths of at least 175 grams per mil across the machine direction and 100 grams per mil across the transverse direction generally indicate that hot working has progressed to a satisfactory point.

Cold flexibility tests are conducted on the materials of this invention by bending a test specimen of the material around a ¼" diameter steel mandrel at the test temperature. Automobile seat materials capable of reasonable endurance should pass this test at test temperatures of −40° F. The mandrel is suitably supported in a cold box having a door opening at the top. A 2 x 8 inch test specimen is maintained in an air circulating oven at 180±5° F. for a period of 24 hours and is then conditioned at room temperature for two hours to attain moisture equilibrium. The specimen is then placed in the cold box in a planar position for 24 hours. Finally, the specimen is bent 180° around the mandrel and inspected for cracks.

BRIEF DESCRIPTION OF THE DRAWINGS

FIG. 4 is a partial side view of the arrangement used to thoroughly heat the knitted materials in the tentering and stress relieving operations. FIG. 5 shows the equipment carrying out a pressing operation that imparts a smooth surface to the material and FIG. 6 is a side view of the coating operation.

DETAILED DESCRIPTION

One hundred parts of a polyvinyl chloride resin having an inherent viscosity of 1.31, which is sold by Union Carbide Corporation under the trade name "Bakelite" vinyl resin QYSL-7, is blended with 10 parts of a water ground calcium carbonate, 3 parts of a precipitated hydrated calcium silicate, 65 parts of a plasticizer, 3.5 parts of a stabilizer, 0.5 part of a lubricant, and 4.5 parts of a pigment. The plasticizer is made up of 6 parts epoxidized octyl tallate, 54 parts of 6–10 alfol phthalate, and 5 parts of di-isodecyl phthalate. The stabilizer is made up of 3 parts of barium-cadmium phenates and 0.5 part of zinc phosphite in solution. A tan color results from the pigment, which is 1.78 parts titanium dioxide, 2.17 parts yellow iron oxide, 0.5 part red iron oxide, 0.05 part carbon black. Blending is continued until the mixture is dry and free flowing.

The blend is charged to a Banbury mixer in which artificial heat and the heat generated by internal friction fuses the materials into a plastic mass. This initial phase of the hot working operation is continued until the temperature of the mass reaches at least 320° F. In place of a batch type Banbury, this phase can be carried out in a continuous type mixer in which two counter-rotating screws mix the ingredients and then force the mixture through a heated orifice to produce a continuous fused ribbon.

Figure 1:
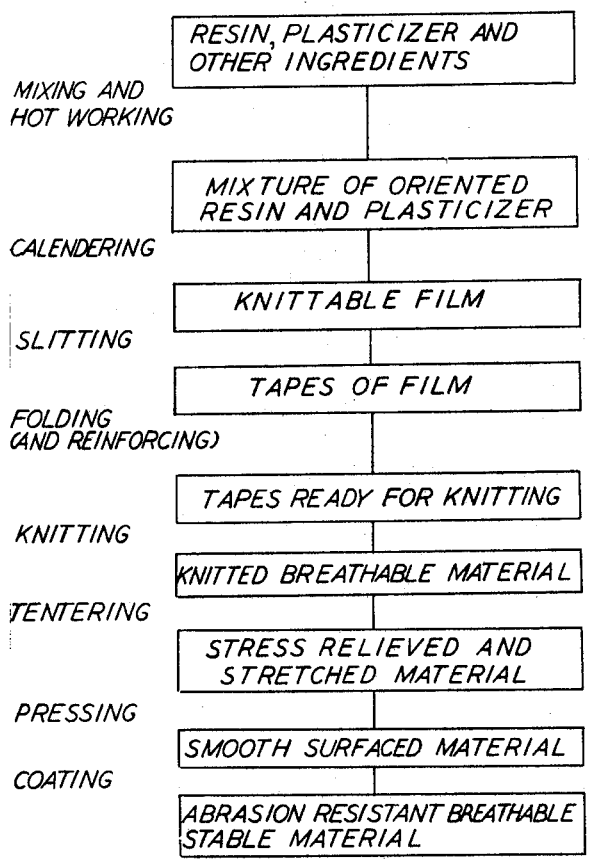
FIG. 1 is a self-explanatory flow chart of the steps necessary to produce the materials of this invention.
Figure 2:
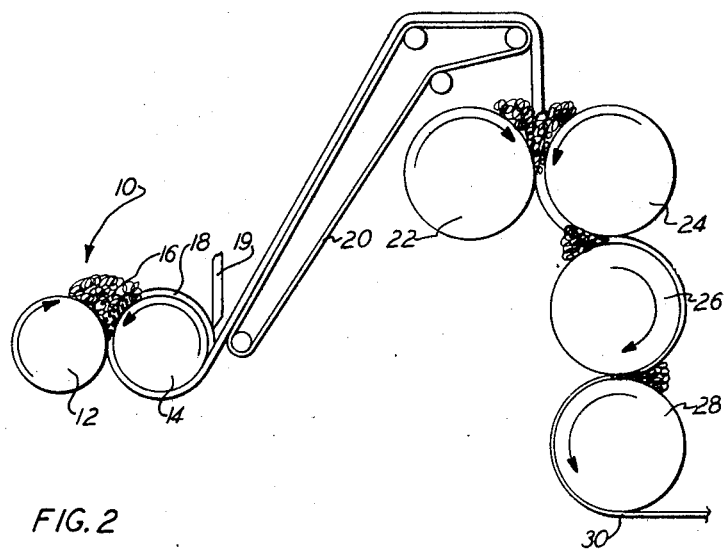
FIG. 2 is a side view of the heated rolls used to complete the hot working operation and perform the calendering operations.

Hot working is continued in a steam heated mill indicated by numeral 10 in FIG. 2. Mill 10 comprises two heated rolls 12 and 14 rotating in the indicated directions with roll 14 rotating at a faster speed than roll 12. The plastic mass 16 is fed to the nip of the rolls and a band 18 of the plastic mass is permitted to form around the faster roll. Generally, roll 12 rotates at a surface speed of about 65 feet per minute and roll 14 rotates at a surface speed of about 82 feet per minute. The mixture temperature reaches about 370° F. Milling is continued until strips cut from band 18 have an Elmendorf tear strength of at least 175 grams per mil across the roll direction and 100 grams per mil across the transverse direction.

A knife 19 directs a suitable portion of band 18 onto a conveyor belt 20 that carries the portion to the nip formed between rolls 22 and 24. Rolls 22 and 24 form the initial portion of the calendering operation and two additional rolls 26 and 28 are located directly below roll 24. Rolls 22, 24, 26 and 28 rotate in the indicated directions. Material passing through the nip of rolls 22 and 24 is carried part of the distance around roll 24 to the nip of rolls 24 and 26. From the nip of rolls 24 and 26 a film of the material is carried part of the way around roll 26 to the nip between rolls 26 and 28 and emerges from the later nip as a thin film 30. Film 30 preferably is about 0.005 inch thick for the best combination of knitting properties and final material properties although satisfactory knitted materials have been obtained with film thicknesses from 0.003 to 0.008 inch.

Figure 3:
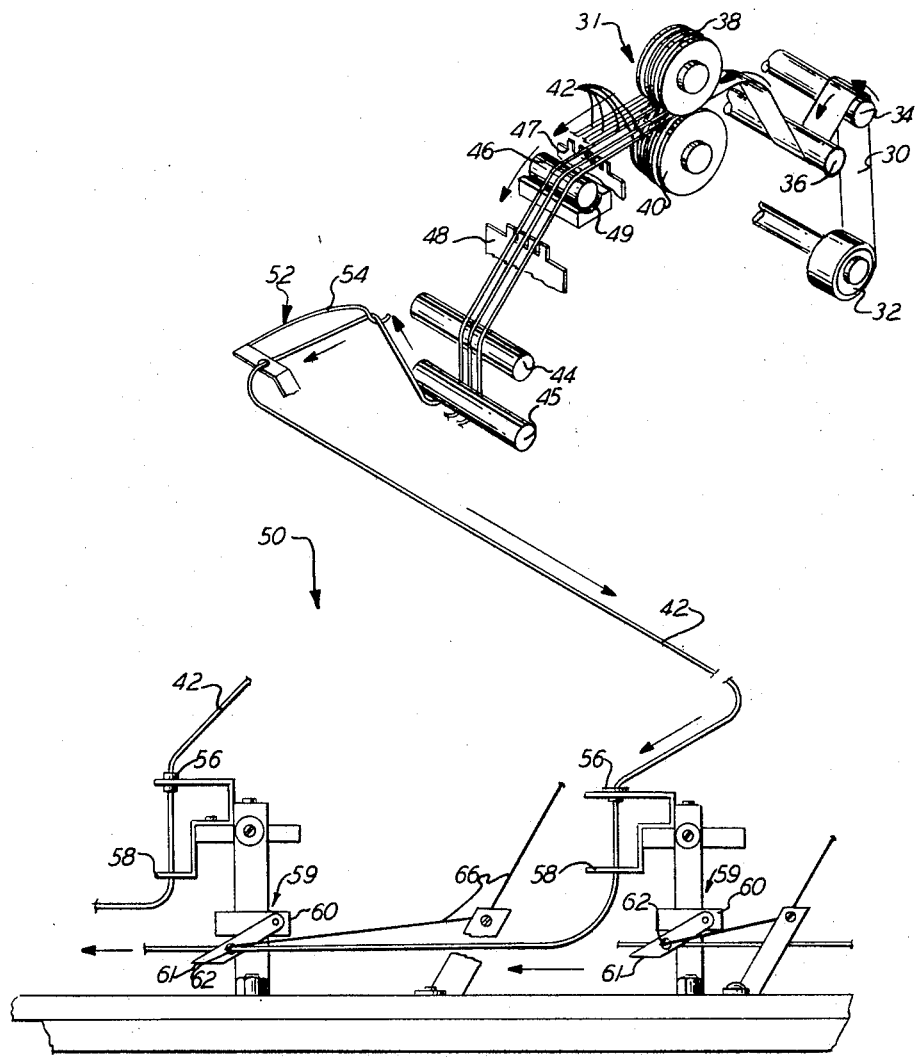
FIG. 3 is a schematic layout of the mechanisms performing the slitting, reinforcing and circular knitting operations.

Film 30 is cooled and wound on a roll approximately 56 inches wide. This roll is sliced into a plurality of rolls about 5 inches wide, and a 5 inch roll is transported to the slitting mechanism indicated in FIG. 3 by numeral 31. In the slitting mechanism a set of drive rolls 34 and 36 unwind the film from the roll 32 and direct the film between an upper arbor 38 and a lower arbor 40 that slit the film into a plurality of thin tapes 42. A second set of drive rolls 44 and 45 draw the tapes across a lubricating roll 46 positioned between two guide combs 47 and 48. Lubricating roll 46 has its lower portion immersed in an open tank 49 containing a water solution of sulfonated castor oil and emulsified paraffin wax. Rolls 44 and 45 direct the tapes to the circular knitting machine indicated in FIG. 3 by numeral 50.

Each tape entering the knitting machine 50 passes through a stop motion device indicated generally by numeral 52. Stop motion device 52 comprises a spring member 54 tensioned into an unstable position by the tension existing in tape 42. If tape 42 should break, the tension holding spring member 54 is released and the spring member returns to a neutral position, thereby tripping a switch (not shown) that shuts down the slitting and knitting machines. The tape then passes through appropriate guides 56 and 58 and is directed through a folding mechanism 59.

Folding mechanism 59 comprises a plate 60 having a spring steel arm 61 attached thereto. Arm 61 projects downward in the direction of movement of the tapes and has a hole 62 formed in its lower end. Hole 62 has a diameter equal to or slightly smaller than the tape width, and as the tapes pass through hole 62, the edges thereof are folded toward each other. Just prior to the point where the tape enters hole 62 a nylon reinforcing yarn 66 is directed to one side of the tape so the folding action folds the tape around the yarn 66. Yarn 66 has a denier of at least about 70. The folded and reinforced tapes are then knitted on the circular knitting machine.

A large cylinder of knitted material is formed by the knitting machine. This cylinder is wound onto a roll and transported to the entrance of a tentering mechanism. As the knitted material is unrolled, it is sliced longitudinally and spread out into a substantially flat sheet. The edges of the sheet then are pinned onto a tenter frame such as that shown in U.S. Pats. Young 2,429,177 or 2,473,404, for example, and the tenter frame transports the sheet into a treating oven.

FIG. 4 is a partial perspective view of the heating zone in the oven. As the material, represented in FIG. 4 by numeral 68, passes into the heating zone, hot air issues from a plurality of pipes 70 and 72 located above and below material 68 respectively. The hot air is directed onto the material at an angle substantially perpendicular to the plane of the material with sufficient velocity to circulate through the pores formed in the knitting operation. This circulation provides essentially uniform heating of material 68, which preferably reaches a temperature of about 275° F. for good stress relief. The pipes in each upper row in the heating zone are spaced laterally 2½ inches center to center (dimension $a$ in FIG. 4) and each pipe has an inside diameter of ½ inch. Each succeeding row is spaced 3 inches downstream from its preceding row (dimension $b$) and each pipe of the succeeding rows is laterally displaced about ½ inch from the pipes in the preceding row (dimension $c$). The ends of the upper pipes are located about 3 inches above the surface of the sheet material, and the hot air issues from the upper pipes at a velocity of about 6,000 feet per minute.

The pipes in each of the lower rows are spaced laterally 5¼ inches center to center (dimension $d$) and each lower pipe has an inside diameter of ⅞ inch. Succeeding rows of lower pipes are about 5 inches downstream from each previous row (dimension $e$), and the pipes in each succeeding row are laterally displaced about 1 inch from the pipes in the previous row (dimension $f$). The ends of the lower pipes are about 8 inches below the surface of the sheet material, and the hot air issues from the lower pipes at a velocity of about 7,000 feet per minute.

A typical heating zone is about 13 feet long and the sheet material moves through the heating zone at about 80 feet per minute. Up to 12 percent of lateral stretching can be performed in conjunction with the stress relieving operation by including a second heating zone in which the sides of the tenter frame move laterally outward. The second heating zone is constructed in the same manner as described above and immediately follows the stress relieving zone.

Lateral stretching continues in a dormant zone about 12 feet long and the material then passes into a cooling zone in which the tenter frame sides again move parallel to each other.

The material then passes through a pressing operation that imparts a smooth texture. Referring to FIG. 5, a rubber roll 74 is positioned next to a drum 76 that is 36 inches in diameter and is heated by steam. On the other side of the drum are two Teflon coated rolls 78 and 80 that are also heated by steam. A steel pressing roll 82 and a rubber backup roll 84 are located below roll 80. An idler roll 86 is positioned adjacent pressing roll 82.

Rubber roll 74 applies the face of the material 68 to the surface of roll 76 and the material face stays in contact with roll 76 for at least 180° of rotation. Upon leaving roll 76, the back of material 68 wraps partially around roll 78 and then the face again contacts roll 80. Material leaving roll 80 has a face temperature of about 300° F., and the material then passes between roll 82 and 84 with the face contacting roll 82. Rolls 82 and 84 exert a pressure on the material sufficient to smooth the face by flowing the polyvinyl chloride; for best results, the pressure must be determined empirically. Roll 82 is water cooled to a surface temperature of less than about 100° F. so the face of the material is chilled before the material leaves roll 82. The material then passes over idler roll 86 and is directed into a cooling chamber (not shown).

A protective coating is then applied to the exposed elements of the sheet material by the apparatus shown in FIG. 6. An applicator roll 94 is fabricated by positioning a fibrous sleeve 96 on a steel core 98. The fibrous sleeve is less than about 0.25 inch thick and best results are obtained with a wool felt sleeve about 0.10 inch thick. A rubber backup roll 100 is positioned adjacent applicator roll 94 and the sheet material 68 is passed between applicator roll 94 and backup roll 100.

Applicator roll 94 is rotated at a speed of about 50 feet per minute in an 8–10 percent by weight solution 102 of polyvinyl chloride and polymethyl methacrylate. Approximately 75 percent of the solids in the solution are polyvinyl chloride with the remainder polymethyl methacrylate. Methyl ethyl ketone can be used as the solvent. A doctor knife 104 positioned adjacent the exterior periphery of applicator roll 94 removes excess solution from the sleeve. As the sheet material passes between rolls 94 and 100, the solution is applied to each exposed element of the material without significantly decreasing the breathability of the material. After the coating solution is applied, the sheet material 68 enters a drying oven 106 maintained at about 300° F. About 0.2 ounce of coating composition is applied per square yard of sheet material. The resulting coating blocks plasticizer migration from the materials, improves the abrasion and soil resistance, and produces a uniform, controlled gloss.

The resulting sheet material weighs about 30 ounces per square yard and has an excellent combination of tensile strength, cold flexibility, and cold impact resistance. In aesthetic apeparance and feel, the material ranks with more expensive and less durable natural or synthetic cloth. The breathability of the material runs about 2,000 cubic inches per second per square inch, which exceeds all materials previously used as automobile seat coverings.

The sheet material may be treated with a solvent for the coating composition prior to and after each coating operation by engaging the material via the applicator roll with the sleeve immersed in a solvent.

What is claimed is:
1. A process for manufacturing an interlaced sheet material comprising folding tapes of a polyvinyl chloride resin having an inherent viscosity between about 1.28 and 1.35, interlacing said tapes into a sheet material, coating the elements of the sheet material without significantly reducing its breathability by engagement with an applicator roll having a fibrous sleeve on a relatively rigid core, said fibrous sleeve having a thickness less than about 0.25 inch, rotating said applicator roll with a portion of its periphery immersed in a solution of the coating composition, and passing the sheet material between a resilient backup roll and the applicator roll.

2. The process of claim 1 comprising removing excess coating solution from the sleeve by positioning a stationary blade adjacent the sleeve between the immersed portion of the sleeve and the point at which the sleeve contacts the sheet material.

3. The process of claim 2 in which the sheet material is made by knitting tapes of polyvinyl chloride and the coating composition is a mixture of polyvinyl chloride and methyl methacrylate.

4. The process of claim 2 comprising coating the elements of the sheet material without significantly reducing its breathability by engaging the sheet material with an applicator roll having a wool felt sleeve.

5. The process of claim 4 comprising rotating the applicator roll with the sleeve immersed in a solvent for the coating composition prior to and after each coating operation.

6. The process of claim 5 in which the sheet material is made by folding the tapes of polyvinyl chloride resin over a reinforcing fiber and knitting said folded tapes into a breathable sheet material.

7. The process of claim 6 comprising hot pressing the surface of the material prior to the coating operation to smooth said surface, said hot pressing comprising heating at least the surface of the material, passing the material between a metal pressing roll and a backup roll, and cooling said pressing roll to reduce the temperature of the surface of the material as the material passes between the pressing roll and the backup roll.

8. The process of claim 1 in which the sheet material is made by rolling the tapes of polyvinyl chloride resin over a reinforcing fiber and knitting said folded tapes into a breathable sheet material.

9. The process of claim 1 comprising hot pressing the surface of the material prior to the coating operation to smooth said surface, said hot pressing comprising heating at least the surface of the material, passing the material between a metal pressing roll and a backup roll, and cooling said pressing roll to reduce the temperature of the surface of the material as the material passes between the pressing roll and the backup roll.

10. The process of claim 1 comprising coating the elements of the sheet material without significantly reducing its breathability by engaging the sheet material with an applicator roll having a wool felt sleeve.

References Cited
UNITED STATES PATENTS

| | | | |
|---|---|---|---|
| 3,119,169 | 1/1964 | Holbrook | 28—74 |
| 3,214,943 | 11/1965 | Marks | 66—125 |
| 3,242,698 | 3/1966 | Marks et al. | 66—125 |
| 3,331,222 | 7/1967 | Marks. | |
| 3,369,957 | 2/1968 | Caroselli et al. | |

ROBERT R. MACKEY, Primary Examiner

U.S. Cl. X.R.

66—125